(12) United States Patent
Rahbar-Dehghan

(10) Patent No.: US 9,227,231 B2
(45) Date of Patent: Jan. 5, 2016

(54) METHOD OF USE OF PORTABLE DUSTING TOOL

(71) Applicant: 1317442 ALBERTA LTD., Canmore, Alberta (CA)

(72) Inventor: Fariborz Rahbar-Dehghan, Canmore (CA)

(73) Assignee: 1317442 Alberta Ltd., Canmore, Alberta (CA)

( * ) Notice: Subject to any disclaimer, the term of this patent is extended or adjusted under 35 U.S.C. 154(b) by 0 days.

(21) Appl. No.: 14/483,380

(22) Filed: Sep. 11, 2014

(65) Prior Publication Data

US 2015/0020846 A1 Jan. 22, 2015

Related U.S. Application Data

(60) Division of application No. 12/756,444, filed on Apr. 8, 2010, now abandoned, which is a continuation-in-part of application No. 11/813,471, filed as application No. PCT/CA2006/000907 on Jun. 2, 2006, now abandoned.

(60) Provisional application No. 60/688,336, filed on Jun. 8, 2005.

(51) Int. Cl.
*B08B 6/00* (2006.01)
*A46B 9/02* (2006.01)
(Continued)

(52) U.S. Cl.
CPC ... *B08B 6/00* (2013.01); *A46B 9/02* (2013.01); *A46B 9/025* (2013.01); *A46D 1/00* (2013.01);
(Continued)

(58) Field of Classification Search
CPC .......... B08B 6/00; B08B 1/002; G03B 17/56; G03B 17/568; A47L 13/40
See application file for complete search history.

(56) References Cited

U.S. PATENT DOCUMENTS

| 1,854,626 A | 4/1932 | Riggall |
| 2,665,443 A | 1/1954 | Simon et al. |

(Continued)

FOREIGN PATENT DOCUMENTS

| JP | 56-087364 A | 7/1981 |
| JP | 57-007464 | 1/1982 |

(Continued)

OTHER PUBLICATIONS

DD Pro Low Pass Filter Cleaner; http://ww.dd-pro.jp/video.html.

*Primary Examiner* — David Cormier
(74) *Attorney, Agent, or Firm* — Fraser Clemens Martin & Miller LLC; James D. Miller

(57) ABSTRACT

A method of use of a dusting tool for cleaning the exposed surface of a camera sensor lens in a recessed digital camera sensor chamber while avoiding contaminating contact with the side walls of the camera sensor chamber, the method comprising the steps of: providing a non-scrubbing duster member having opposite one and another ends, and a tuft of bristles having electrostatic charge built up therein; engaging the duster member inside the camera sensor chamber; operatively engaging the bristles leading edge tips onto the exposed surface of the camera sensor lens; and manually sweeping the dusting tool bristles leading edge tips over the full exposed surface of the camera sensor lens including the peripheral edge portion thereof but excluding contaminating contact with the side walls of the camera sensor chamber, while the duster member remains motionless relative to the handle.

6 Claims, 10 Drawing Sheets

(51) Int. Cl.
*A46D 1/00* (2006.01)
*B08B 1/00* (2006.01)
*B08B 11/00* (2006.01)
*G03B 17/56* (2006.01)

(52) U.S. Cl.
CPC ............... *A46D 1/0276* (2013.01); *B08B 1/00* (2013.01); *B08B 1/002* (2013.01); *B08B 11/00* (2013.01); *G03B 17/568* (2013.01); *A46B 2200/3026* (2013.01); *A46B 2200/3073* (2013.01)

(56) References Cited

U.S. PATENT DOCUMENTS

| | | | |
|---|---|---|---|
| 2,778,043 A | 1/1957 | Arf | |
| 2,972,763 A | 2/1961 | Payne | |
| 3,355,755 A | 12/1967 | Brooks | |
| 4,479,279 A | 10/1984 | Schroeder | |
| 4,610,925 A | 9/1986 | Bond | |
| 4,941,230 A | 7/1990 | Lamore | |
| 5,235,716 A * | 8/1993 | Stella | A46B 7/04 15/23 |
| 5,405,450 A | 4/1995 | Mifsud | |
| 5,471,695 A | 12/1995 | Aiyar | |
| 5,689,791 A | 11/1997 | Swift | |
| 5,957,090 A | 9/1999 | Larson | |
| 6,532,354 B2 | 3/2003 | Maher et al. | |
| 2001/0055072 A1 * | 12/2001 | Mogamiya | H04N 5/2254 348/335 |
| 2003/0031489 A1 | 2/2003 | Maher et al. | |
| 2004/0134023 A1 | 7/2004 | Caruso | |
| 2008/0087297 A1 | 4/2008 | Rahbar-Dehghan | |

FOREIGN PATENT DOCUMENTS

| | | |
|---|---|---|
| JP | 58-130655 | 8/1983 |
| JP | 08-336494 A | 12/1996 |
| JP | 09-251654 A | 9/1997 |
| JP | 11-216089 A | 8/1999 |
| JP | 2001046294 A | 2/2001 |
| JP | 2004516900 A | 6/2004 |
| WO | 0243524 A2 | 6/2002 |
| WO | 2005117679 A1 | 12/2005 |
| WO | 2006133119 A2 | 12/2006 |

* cited by examiner

METHOD OF USE OF PORTABLE DUSTING TOOL

CROSS REFERENCE DATA

The present patent application is a divisional of co-pending U.S. patent application Ser. No. 12/756,444, incorporated herein by reference, which was a Continuation-In-Part of U.S. patent application Ser. No. 11/813,471, which was an Entry into U.S. National Phase of PCT application No. PCT/CA2006/000907 filed on Jun. 2, 2006 and also claimed conventional priority of U.S. provisional patent application No. 60/886,336 filed Jun. 8, 2005.

FIELD OF THE INVENTION

The present invention relates to cleaning devices, and more particularly to a portable dusting tool for cleaning delicate surfaces.

BACKGROUND OF THE INVENTION

Digital cameras comprise an electronic sensor, such as a charge-coupled device (CCD) sensor or Complementary Metal Oxide Semiconductor (CMOS) sensor, lodged in a recessed sensor chamber of the camera, and onto which is projected the image of what is seen through the lens of the camera. This sensor can acquire the image projected thereon and convert it into electronic data, which is thereafter forwarded to data processing means provided on the digital camera. The data processing means then converts this electronic data into an image file of known format, such as in JPEG, TIFF or RAW formats, stored thereafter on the memory card of the camera. Of course, this sensor must remain as clean as possible, since impurities deposited thereon can undesirably alter the final image acquired by the camera.

It is inevitable that during normal use of a digital camera, its sensor will become exposed to the atmosphere and its airborne impurities, such as minute airborne dust particles. More particularly, on professional digital cameras having interchangeable lenses such as digital single-lens reflex (DSLR) cameras, the sensor exposed lens surface inevitably becomes contaminated by the atmosphere and its impurities whenever the lens is removed from the body of the camera, for example when switching lenses.

To clean the sensor of their digital cameras, and more particularly to remove dust particles from its surface, digital camera owners have come up with a number of cleaning methods.

A common cleaning technique used by digital camera owners is to blow air from a canned air duster directly about the surface of the sensor. This technique, in addition to blowing away the dust on the sensor, has the adverse effect of dispersing and not removing dust particles.

An alternate technique is to blow canned air into the bristles of a brush and then sweeping the surface of the sensor with the brush. Pressurized air is blown on the bristles for two purposes: (1) for blowing away all impurities that may be present between the bristles of the brush, and (2) for electrostatically charging the bristles of the brush, and thus enhancing the brush's capacity to pick up dust particles present on the camera sensor.

However, this latter technique also has its drawbacks. Indeed, liquid sometimes squirts out of canned air dusters when air is blown on the bristles, and liquid can thereafter be undesirably smeared on the surface of the sensor when the brush is swept thereacross. Another disadvantage of using canned air dusters is that they are pressurized containers and it is prohibited to bring them aboard aircrafts, which can be inconvenient for travelling photographers for example. Furthermore, pressurized air duster cans are not reusable, and after such a duster has been emptied, it is disposed of and a new one must be purchased.

SUMMARY OF THE INVENTION

The invention relates to a non-scrubbing dusting tool for cleaning the exposed surface of a digital camera sensor lens in a recessed digital camera sensor chamber, said dusting tool comprising: a duster member defining an elongated shank having opposite one and another end, a tuft of bristles having electrostatic charge built up therein, and first connector means directly coupling said tuft of bristles to said shank one end; a handle; and second connector means directly coupling said handle to said shank another end; wherein each of said bristles define a corresponding leading edge tip opposite said shank, said leading edge tips for operative engagement with the sensor lens; wherein said duster member is sized to adjustably fit inside the camera sensor chamber in such a fashion that said bristles leading edge tips will be able to reach all of the exposed surface of the camera sensor lens while avoiding contaminating contact with the camera sensor chamber; and wherein in an operative sensor lens cleaning condition of said dusting tool, said duster member remains motionless relative to said handle while said dusting tool bristles leading edge tips are manually swept over the camera sensor lens to be cleaned.

Preferably, there is further included a selectively activated duster actuator, fixedly mounted to said handle and rotatably mounted to said shank; said actuator operating only when said dusting tool is not cleaning the sensor lens; wherein once said electrostatic charge of said tuft of bristles has been depleted, said electrostatic charge thereof is recharged while concurrently removing dust collected by said bristles by bringing said duster tool to an inoperative sensor lens cleaning condition away from the camera sensor chamber and with said actuator being powered to power rotate said shank, wherein said bristles will fan out radially under centrifugal forces.

Said actuator could then be lodged into a cavity made into said handle. Said first connector means could also consist of a tubular element, integral to said shank one end and defining a flattened mouth portion opposite said shank one end, said tuft of bristles defining an inner end portion frictionally taken in sandwich within said tubular element flattened mouth portion.

Preferably, said tubular element flattened mouth portion further defines a pair of opposite notches, said notches engaged by registering bristles from said tuft of bristles, wherein said tuft of bristles form a V-shape in said operative lens cleaning condition of said dusting tool, said V-shape providing enhanced lens cleaning capabilities The bristles could be made from polyimide, and preferably having a thickness with the range of 40 to 60 micrometers, and preferably being tapered at their leading edge tip portion. The electrostatic charge build up of said bristles could enable attraction of macroscopic particles up to 14 millimeters in total length, and/or attraction of macroscopic particles down to 1 micrometer in total length.

The invention also relates to a method of use of a dusting tool for cleaning the exposed surface of a camera sensor lens in a recessed digital camera sensor chamber while avoiding contaminating contact with the side walls of the camera sensor chamber, the method comprising the following steps: a) providing a non-scrubbing duster member defining an elongated shank having opposite one and another ends, a tuft of bristles having electrostatic charge built up therein and first connector means directly coupling said tuft of bristles to said shank one end; a handle; and second connector means directly coupling said handle to said shank another end, with each of said bristles defining a corresponding leading edge tip opposite said shank; b) engaging said duster member inside the camera sensor chamber;

c) operatively engaging said bristles leading edge tips onto the exposed surface of the camera sensor lens; d) manually sweeping said dusting tool bristles leading edge tips over the full exposed surface of the camera sensor lens including the peripheral edge portion thereof but excluding contaminating contact with the side walls of the camera sensor chamber, while said duster member remains motionless relative to said handle.

Preferably, in step (a), the electrostatic charge build-up is imparted to said bristles by applying a chemical to said bristles. Alternately, in step (a), the electrostatic charge build-up if said bristles is imparted to said bristles by applying an ionization treatment to said bristles. There could also be further included the steps of: providing a selectively activated duster actuator, fixedly mounted to said handle and rotatably mounted to said shank; depleting said electrostatic charge of said tuft of bristles following said sweeping action of said dusting tool bristles leading edge tips; bringing said duster tool to an inoperative sensor lens cleaning condition and away from the camera sensor chamber; and powering said actuator wherein said shank is power rotated and said bristles are brought to fan out radially under centrifugal forces leading to recharging of said electrostatic charge of said bristles while concurrently removing dust collected by said bristles during said manual sweeping step.

Preferably, in step (c), said operative engagement of the bristles leading edge tips includes the step of non-contacting sweeping action over the exposed surface of camera sensor lens in closely spaced fashion relative thereto. Alternately, in step (c), said operative engagement of the bristles leading edge tips includes the step of direct contacting sweeping action against the exposed surface of camera sensor lens.

The invention also relates to the combination of a digital camera having a recessed camera sensor chamber and a sensor lens at a flooring section of said camera sensor chamber, said sensor lens having an exposed surface opening into said camera sensor chamber, and a non-scrubbing dusting tool for cleaning said exposed surface of said camera sensor lens, said dusting tool comprising: a duster member defining an elongated shank having opposite one and another end, a tuft of bristles having electrostatic charge built up therein and first connector means directly coupling said tuft of bristles to said shank one end; a handle; and second connector means directly coupling said handle to said shank another end; wherein each of said bristles define a corresponding leading edge tip opposite said shank, said leading edge tips adapted to operatively engage with said sensor lens; wherein said duster member is sized to adjustably fit inside the camera sensor chamber in such a fashion that said bristles leading edge tips will be able to reach all of the exposed surface of the camera sensor lens while avoiding contaminating contact with the camera sensor chamber; and wherein in an operative sensor lens cleaning condition of said dusting tool, said duster member remains motionless relative to said handle while dusting tool bristles leading edge tips are manually swept over the camera sensor lens to be cleaned.

Preferably, there is further included an elongated protective cap, releasably mounting over said duster member in friction fit fashion against said second connector means when said dusting tool is not in use.

BRIEF DESCRIPTION OF THE DRAWINGS

In the annexed drawings:

FIG. 5, on the third sheet of drawings, is a view similar to FIG. 3, but showing a third embodiment of dusting tool;

DETAILED DESCRIPTION OF THE EMBODIMENTS

Figure 1:
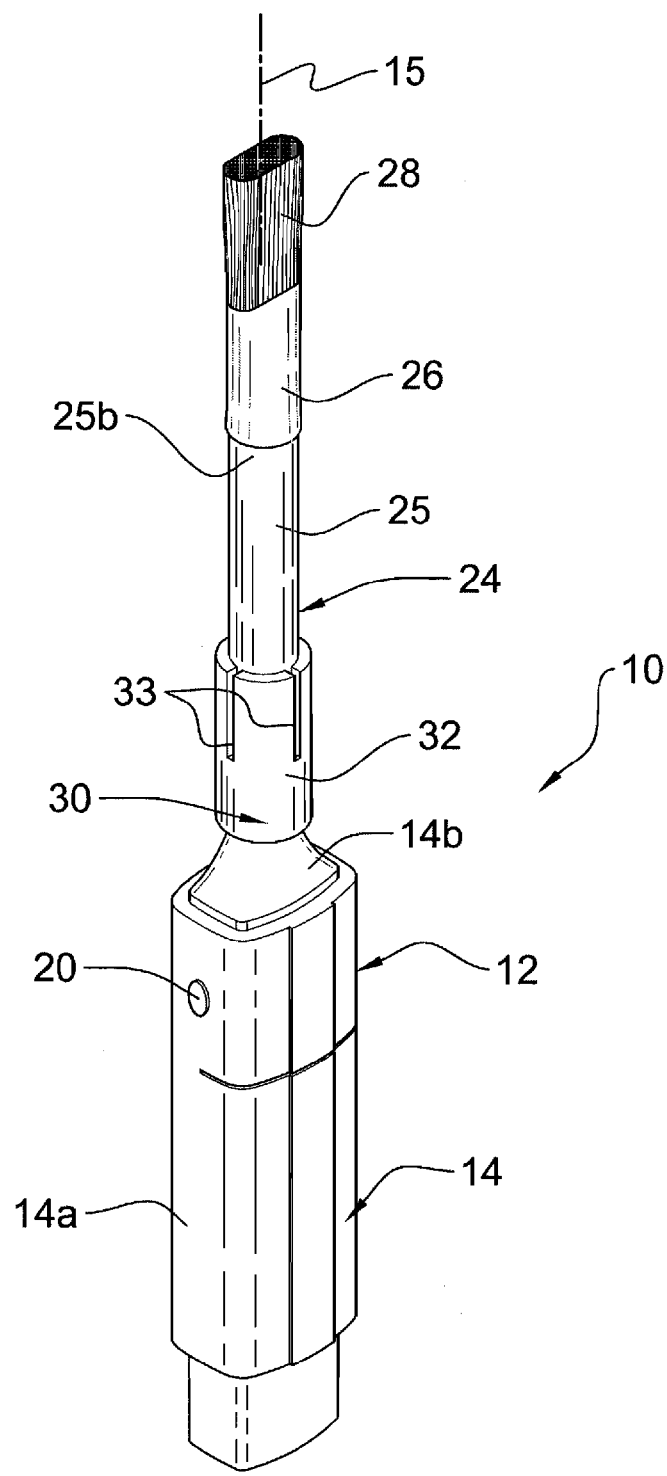
FIG. 1 is a perspective view of a dusting tool according to a first embodiment of the present invention.
Figure 2:
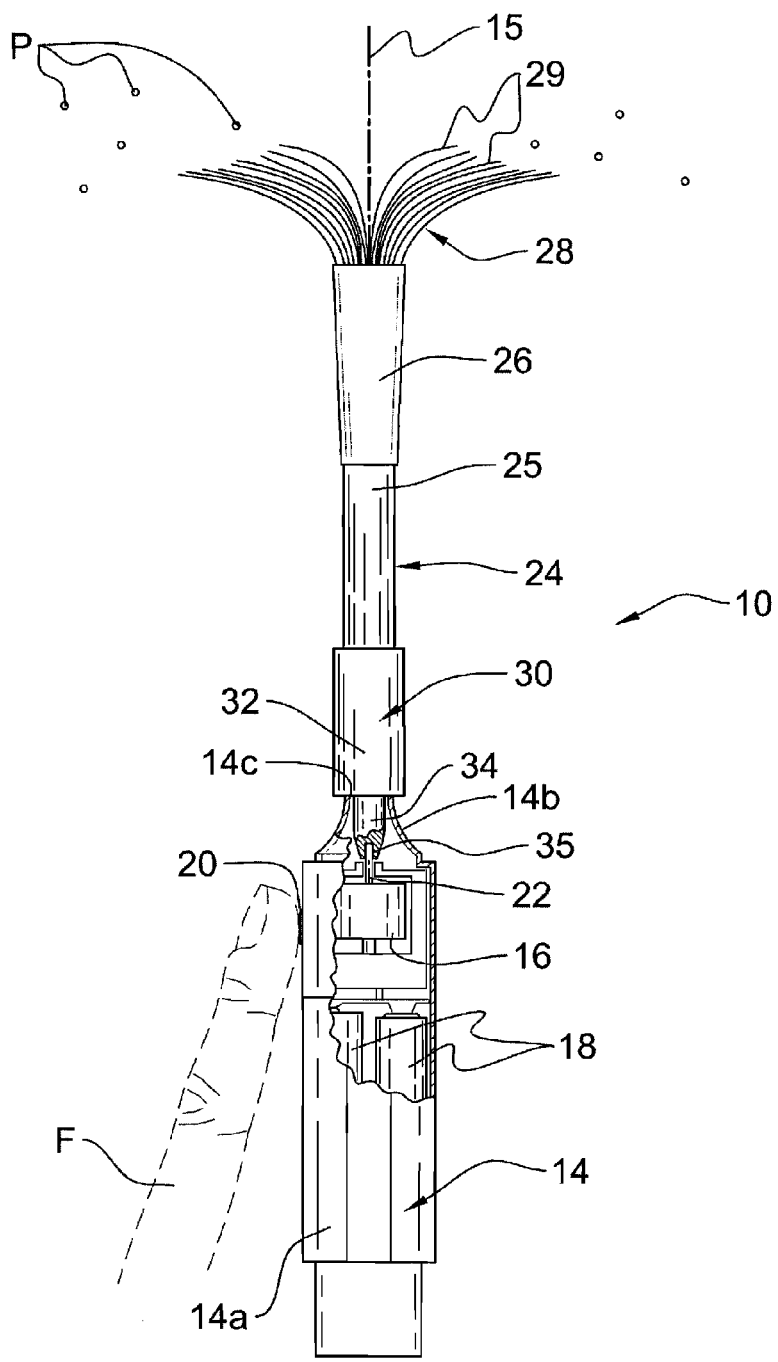
FIG. 2 is a front elevation of the dusting tool of FIG. 1 with the handle member and the brush connector cut away, and showing how the bristles of the brush fan out and are rid of dust when the user activates the dusting tool shank rotating motor.
Figure 3:
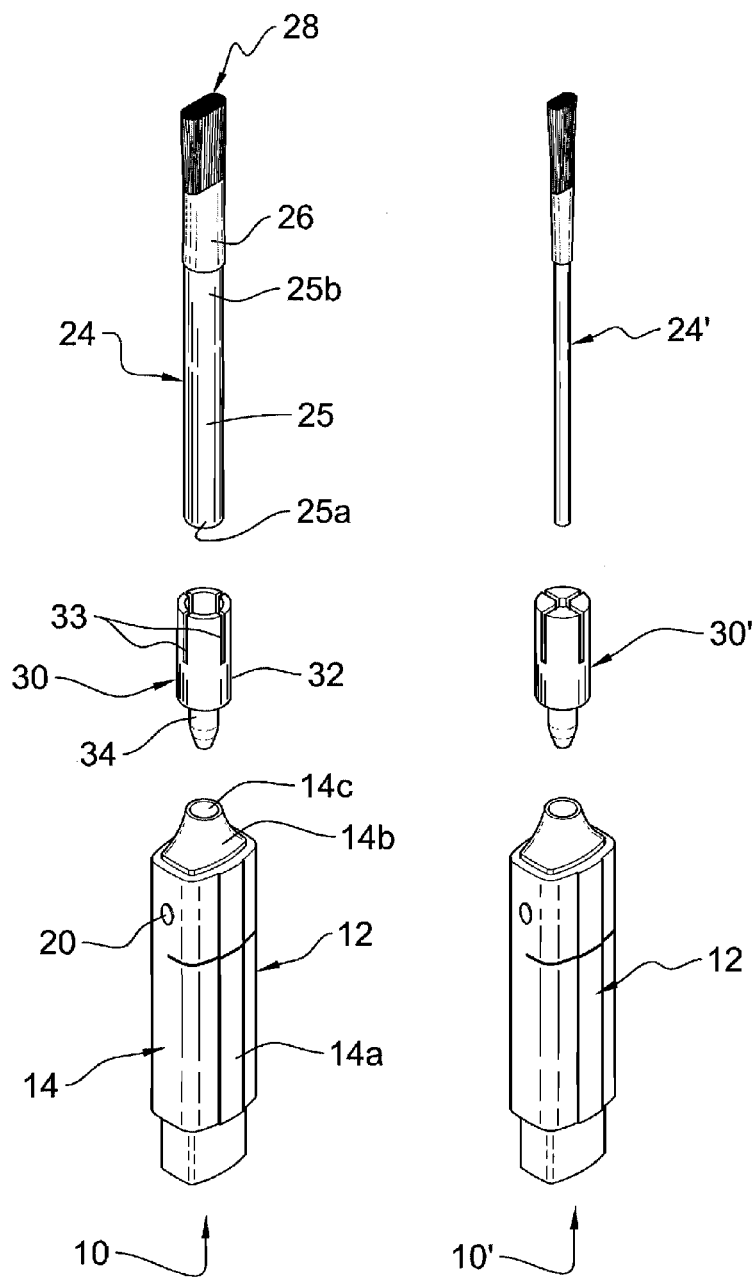
FIG. 3 is an exploded front perspective view of the embodiment of dusting tool of FIG. 1, the dusting tool having a brush and corresponding brush connector.

FIGS. 1-3 show a portable dusting tool 10 for digital camera sensors according to one embodiment of the present invention. Sensor dusting tool 10 comprises a handle member 12, in turn comprising a casing 14. Casing 14 defines an elongated main body portion 14a, and a neck portion 14b extending from one end of main body portion 14a.

Casing 14, as can be seen in FIG. 2, is at least partially hollow and in one embodiment may comprise a brush actuator therein, such as an electric rotary motor 16 powered by batteries 18. Batteries 18 are electrically connected to motor 16 as known in the art, for example by wires (not shown). Handle member 12 is also provided with a switch 20 controlling the selective powering of motor 16 by batteries 18, and which the user can depress with his finger F (as suggested in FIG. 2) to activate motor 16.

Motor 16 comprises a rotary shaft 22 connected to and rotating as one with the rotor (not shown) of motor 16. Shaft 22 extends within the hollow casing neck portion 14b.

Dusting tool 10 also comprises a duster member connected to the brush actuator. More particularly, dusting tool 10 is provided with a duster brush 24 that may be operatively coupled to motor 16 through the instrumentality of a brush connector 30. Brush connector 30 comprises a cylindrical and tubular socket portion 32, in turn having an open top to allow insertion of the butt end portion of duster brush 24 therein. Socket portion 32 defines four slots 33 extending from its top rim end towards its bottom end and stopping short of the latter. Slots 33 allow the sections of socket 32 therebetween to radially outwardly spread apart as duster brush 24 is inserted in socket portion 32.

Moreover, brush connector 30 also comprises an elongated coupling pin 34 tapering towards its outer end, integrally and coaxially affixed to the bottom end of elongated socket portion 32. The outer free end of coupling pin 34 is centrally and axially bored, and an elongated and cylindrical cavity 35 thus extends coaxially along coupling pin 34 (only shown in FIG. 2).

Brush connector 30 can be coupled to motor 16 by inserting coupling pin 24 in the opening 14c at the outermost end of casing neck portion 14b, such that the motor's shaft 22 becomes snugly friction-fitted in cavity 35 of coupling pin 34.

As mentioned above, brush connector 30 is preferably operatively coupled to the duster brush motor 16. Duster brush 24 comprises a shank 25, made of wood for example, and whose butt end portion 25a is destined to be received and friction-fitted in the lumen of brush connector socket portion 32. Shank 25, at its upper end portion 25b, comprises a brush head formed of a ferrule 26 holding a bunch of bristles 29 in a tuft 28. Bristles 29 are destined to be swept about the sensor of a digital camera to pick up and collect dust that may be present thereon, as described hereinafter.

Importantly, rotary motor 16 is always inoperative when bristles 29 sweep the sensor lens 160 (FIGS. 11-12), i.e. bristles 29 never spin during sensor lens cleaning operations.

Casing 14, motor shaft 22, brush 24, connector socket portion 32 and coupling pin 34, are all elongated structures and are arranged coaxially to each other, and define a common longitudinal axis 15.

Bristles 29 are preferably made of a synthetic material, e.g. a polyamide material such as Nylon®, but could also be made of a natural material such as feather, wool, or fur. Moreover, bristles 29 are imparted with the following characteristics:

They are preferably soft and resilient. If the bristles are not flexible and resilient enough, they will be prone to breaking during use, and thus broken pieces of bristles may become lodged in the recessed digital camera sensor chamber (not shown) in which the camera sensor lens is nested. Moreover, softer and more resilient bristles are less prone to breaking and are thus more durable. Finally, the bristles need to be delicate enough to be swept about a sensitive surface (e.g. that of a camera sensor) without scratching it.

For optimal performance, bristles 29 preferably have a thickness ranging between 40 to 60 μm (micrometers).

They have an enhanced electrostatic charge build-up capability. The bristles can readily accumulate electrostatic charges, in order to be able to electrostatically attract dust particles and other macroscopic impurities (e.g. maximum total length of 15 mm) and preferably microscopic impurities (e.g. minimum total length of 1 μm). This characteristic could be imparted to the bristles either (1) during pre-processing, by producing the bristles out of a material having inherent electrostatic charge build-up capabilities; or (2) during post-processing, by applying a chemical or ionization treatment to the produced bristles.

Enhanced resistance to chemical substances. This is a desirable characteristic since any alteration in chemical composition of the bristles will affect its capability to electrostatically attract dust.

The width of the tuft of bristles 28 should be adapted to the size of the optical sensor it is destined to be used on. The tuft of bristles 28 can have a width ranging for example between 1 and 60 millimeters, and should be small enough to fit into the camera's recessed sensor chamber, and it may be large enough to sweep the entire surface of the camera's sensor in a single stroke. Moreover, and as suggested in FIG. 11, ferrule 26 must have a smaller width than that of the tuft of bristles such that a clearance exists between ferrule 26 and the walls 264 of the sensor chamber 262 when the duster brush 24 is used to sweep the sensor 260, hence preventing scratching by the ferrule 26 of the sensor chamber walls 264. For example, a brush 24 with a ferrule 26 having a width of 20 mm, and a tuft of bristles 28 having a width of 24 mm, should preferably be used when cleaning a full frame sensor having dimensions of 36 mm×24 mm.

The dusting tool according to the illustrated embodiment is made modular in order to be able to receive brushes of different dimensions. This is suggested in FIGS. 3 and 5, where dusting tools 10 and 10' respectively have differently sized brushes 24, 24' and complementary brush connectors 30, 30' respectively. These brush/connector combinations, even though they have differing dimensions, can be coupled to a same handle member 12.

To use the dusting tool 10, it must first be assembled. To do so, the user first inserts batteries 18 in the battery housing if necessary. The user then selects a duster brush 24 of the desired dimensions and inserts the butt end portion 25a of its shank 25 in the corresponding brush connector socket 32. The user then connects brush connector 30 to motor 16 by inserting its coupling pin 34 through casing neck portion opening 14c, and by friction-fitting motor shaft 22 in the coupling pin cavity 35.

Prior to dusting a surface such as a camera sensor 260, it is desirable to rid the tuft of bristles 28 from ambient dust particles that may have gravitated towards it, and/or to remove dust particles that may have remained within the tuft of bristles 29 after a previous use of the dusting tool. It is further necessary to electrostatically charge the bristles 29 in order for them to be able to electrostatically attract and collect dust from the surface to be dusted.

To do so, the user depresses switch 20, which activates motor 16 and consequently spins elongated brush 24 along its longitudinal axis at a substantially high speed. This causes the bristles 29 of the brush to fan out radially as suggested in FIG. 2. The rotation of brush 24 has two effects:

the bristles 29 of the brush move rapidly relative to ambient air molecules. Bristles 29, as mentioned above, have the inherent capacity to easily build-up an electrostatic charge. Thus, the friction between the rotating bristles 29 and the ambient air molecules causes the bristles 29 to develop an increased electrostatic charge.

the dust particles P that may have become lodged between bristles 29 centrifugally accelerate and are expelled from the tuft of bristles 28.

Activating motor 16 thus charges the bristles 29 and concomitantly rids brush 24 from dust particles and various other impurities that may be lodged between its bristles 29, and prepare dusting tool 10 for future use on a surface to be dusted.

After motor 16 has been deactivated and after rotation of brush 24 has stopped, brush 24 can then be inserted in the sensor chamber 262 of the digital camera 266, and the non-spinning tuft of bristles 28 can be gently swept across the surface of the camera sensor. Mechanical contact between the distal end portion of the bristles 29 and the digital camera sensor 260 is possible but not essential. Indeed, bringing the tip of the bristles 29 in closely spaced fashion to the digital camera sensor 260 may be sufficient to enable the dust to be attracted by and gravitate towards the electrostatically charged bristles 29, and to be fully operational to dislodge dust. Since bristles 29 are electrostatically charged, dust particles present on the sensor's surface 260 cling to the bristles 29 of the brush 24, and are hence removed form the sensor surface 260.

Modifications to the above-described embodiment could be made without departing from the scope of the present invention. For example, the dusting tool 10 could be provided with means enabling the user to select various motor speeds for example between 5000 to 20000 RPM in order to vary the rotation speed of the duster brush 24. Alternately, the duster actuator 16 could be something else than a mere rotary motor; it could for example be a powered actuator selectively activated to engender vibration, rotation, sonication, reciprocating axial motion, or a combination of these actions, of the duster brush 24 including its bristles 29, in order for the bristles 29 to become electrostatically charged and for impurities lodged between the bristles to be expelled out of the brush.

Alternatively, the motor 16 could be replaced by an alternate duster actuator that does not require batteries, for example a manual actuator composed of a series of cooperating gears which can be set in motion by manually rotating a crank.

It is also understood that the brush connector 30 providing modularity to the dusting tool, and releasably connecting the duster brush 24 to the motor 16, is optional. It is understood that any suitable fastening means, whether they be permanent or quick-release fastening means, could be used to fasten the duster member to the duster actuator. Alternately, the duster brush 24 could be directly connected to the duster actuator 16 in any conventional manner.

Figure 4:
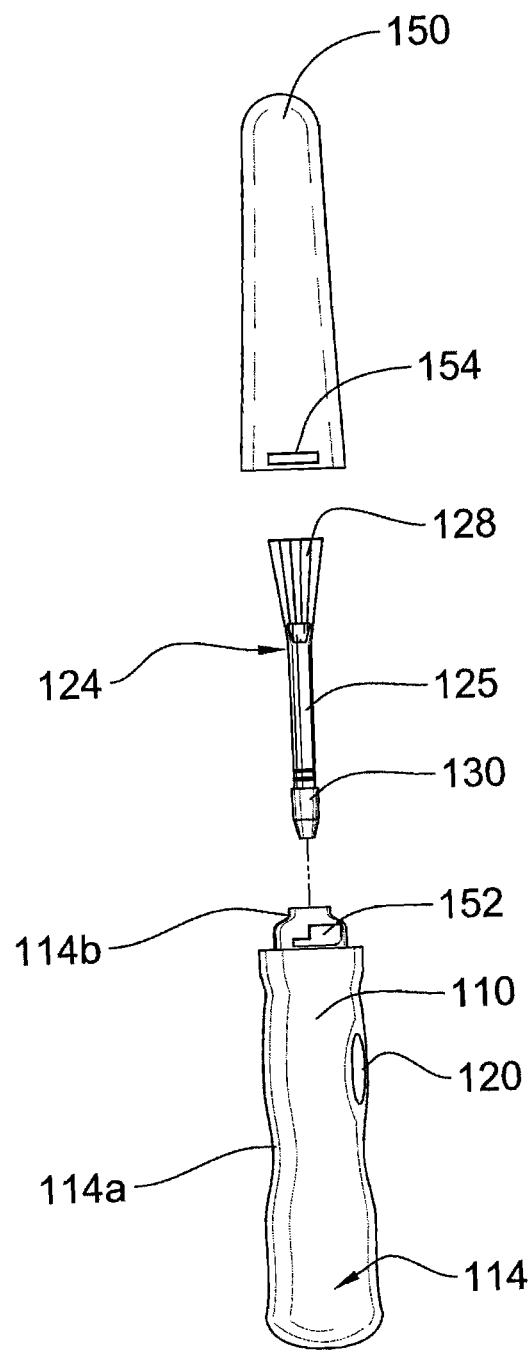
FIG. 4 is a partially exploded, front elevation view of a dusting tool according to a second embodiment of the present invention.
Figure 7:
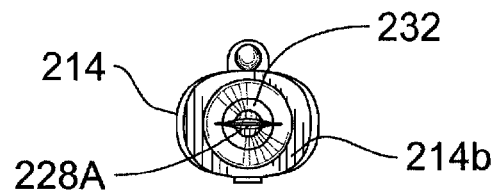
FIG. 7 is a top end view of the dusting tool of FIG. 6.

FIG. 4 shows a duster tool 110 according to an alternate embodiment of the present invention. Duster tool 110 comprises a handle member 112 defining a casing 114, in turn defining an ergonomically shaped main portion 114*a* and a neck portion 114*b*. Casing 114 houses a motor therein (not shown), the motor having a rotary shaft (not shown) extending at least partially in casing neck portion 114*b* and whose rotary movement is controlled by a switch 120. Moreover, duster tool 110 has a brush member 124 defining a tubular shank 125 (metallic for example), the upper end of which is pressed around a tuft of bristles 128. Shank 125 fixedly carries, at its bottom end, a connector member 130 (made of plastic for example). Connector member 130 defines a cavity therein (not shown), similar to cavity 35 of brush connector 30 of FIG. 2, into which can be snugly friction fitted the shaft of the duster tool's rotary motor. In the embodiment of FIG. 4, brush member 124 and the connector member 130 are fixedly assembled together, and it is this fixed assembly as a whole that is releasable from handle member 112. Moreover, duster tool 110 is provided with a hollow, elongated protective cap 150 which can be slipped around the brush 124 and secured to the casing 114 by twisting it in place to friction-fit a projection 154 made on the inner peripheral wall of the protective cap 150 within a groove 152 made into the casing neck portion 114*b*.

Figures 6, 8:
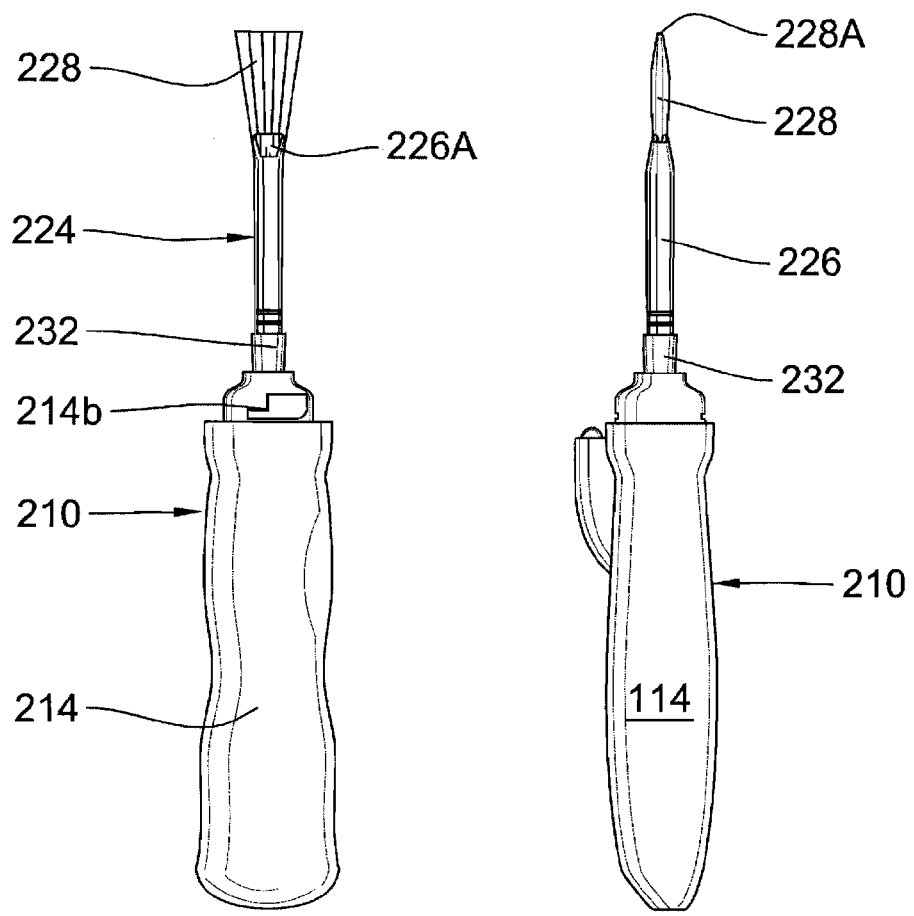
FIG. 6 is a plan view of a fourth embodiment of dusting tool.
FIG. 8 is a view similar to FIG. 6, but with the dusting tool rotated by a quarter of a turn.
Figure 9:
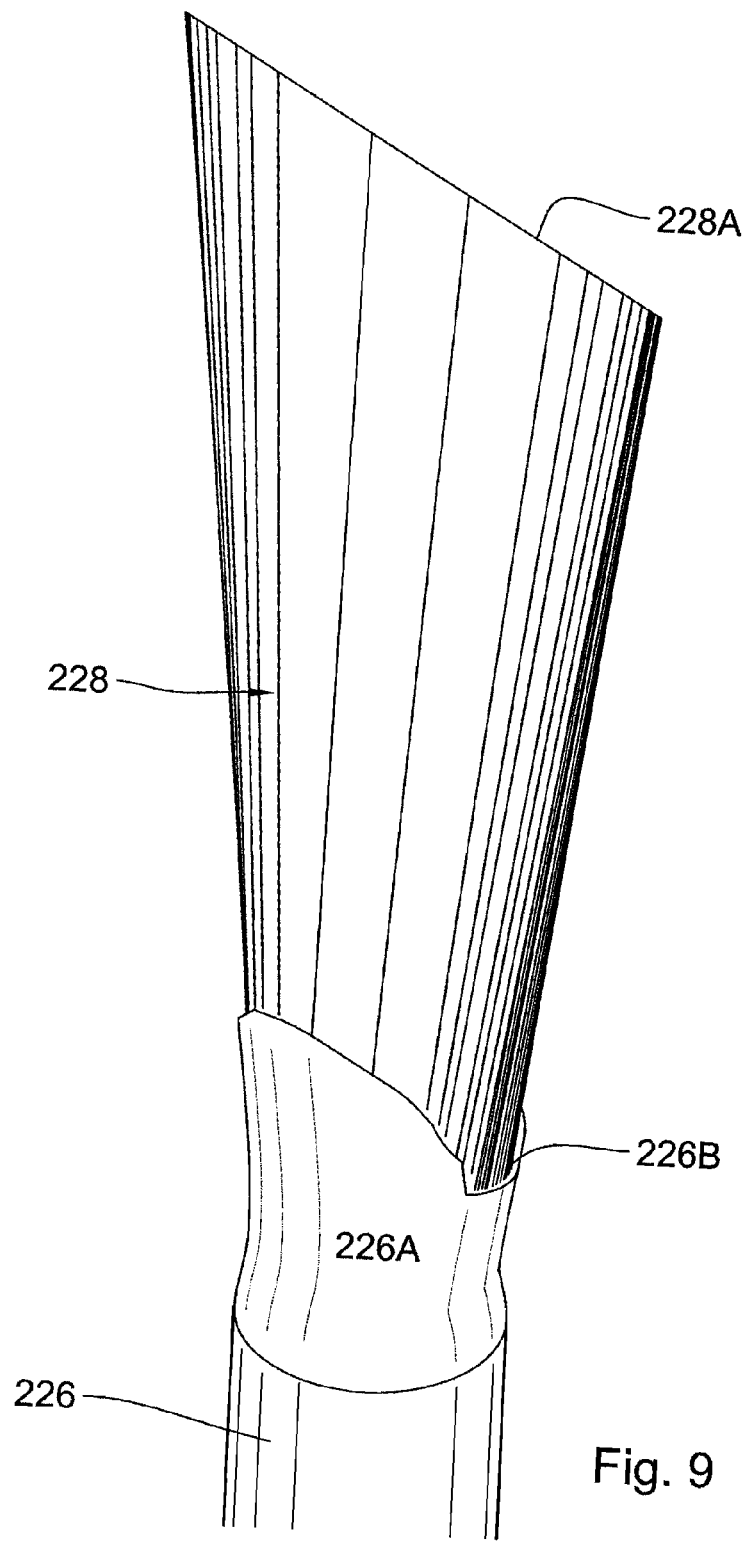
FIG. 9 is an enlarged perspective view of the top end portion of the dusting tool of FIG. 6.
Figure 10:
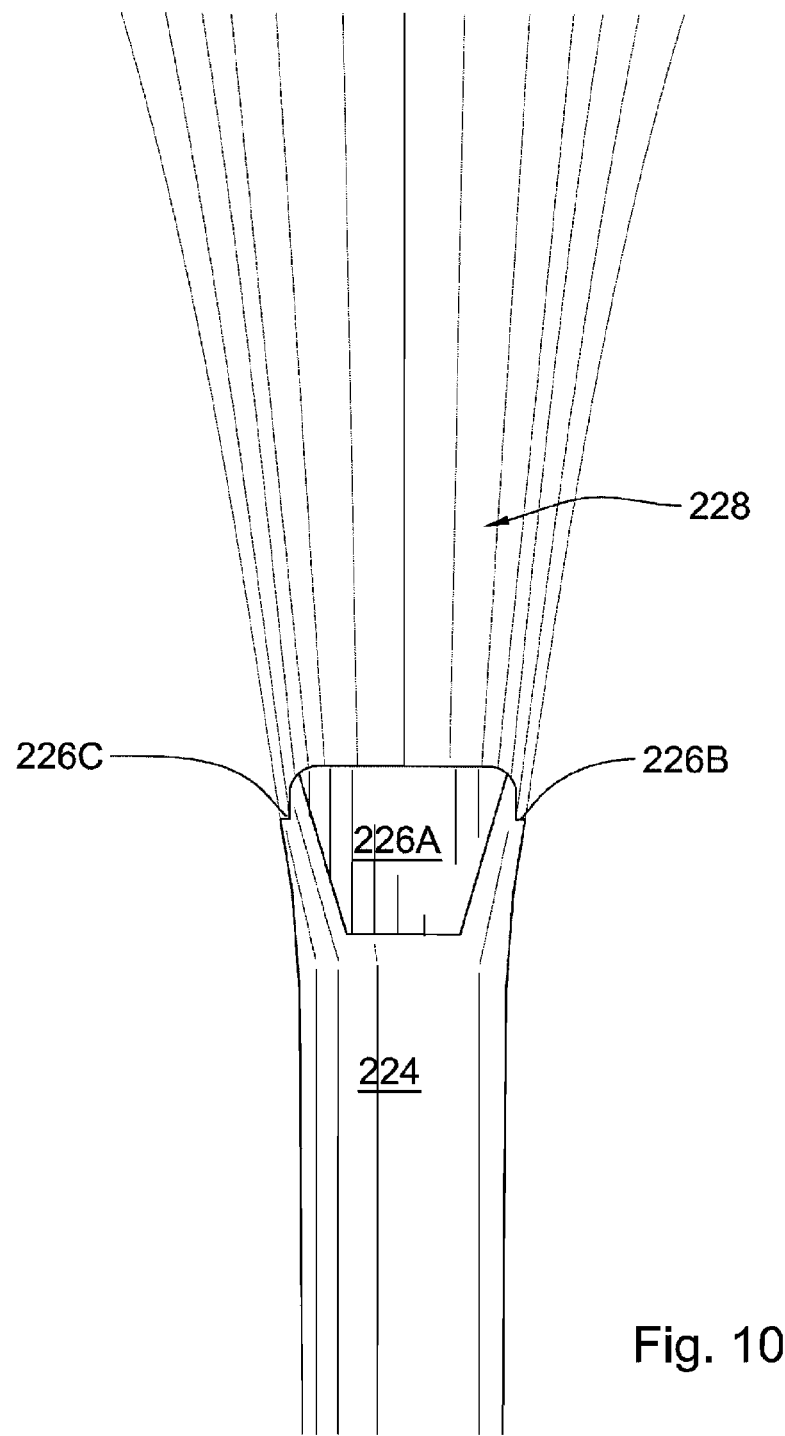
FIG. 10 is a plan view of the dusting tool components of FIG. 9.

In still another embodiment of dusting tool 210 shown in FIGS. 6 to 10, a contoured unibody handle 214 is provided. Socket 232 interconnects handle neck 214*b* to duster brush 224. In brush 224, ferrule 226 coaxially interconnects elongated shank 225 with the tuft of bristles 228. Ferrule 226 includes a flattened outer end mouth portion 226A into which becomes frictionally interlocked the inner end portion of the tuft of bristles 228. Ferrule mouth portion 226A further includes two opposite notches 226B, 226C, that enable some adjacent bristles to engage therein. Hence, notches 226B, 226C enable the tuft of bristles 228 to form an outwardly diverging V-shape, as best shown in FIGS. 6 and 10. The V-shape of the tuft of bristles 228 optimizes performance of the dust brush 124, in facilitating access of the bristles to hard to reach areas in the recessed digital camera sensor chamber 262 (FIG. 11).

Figure 12:
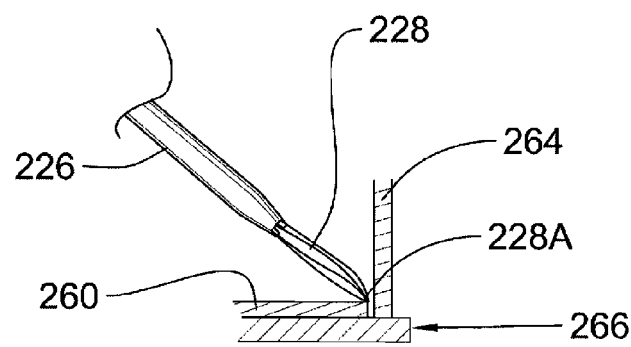
FIG. 12 is a partly schematic side elevational view of the camera sensor chamber of FIG. 11, suggesting how the non-spinning bristles of the dusting brush of the present invention can reach out to the full peripheral edge portion of the exposed surface of the sensor lens of the camera sensor chamber while avoiding contaminating contact with the adjacent upright walls of the camera sensor chamber.
Figure 11:
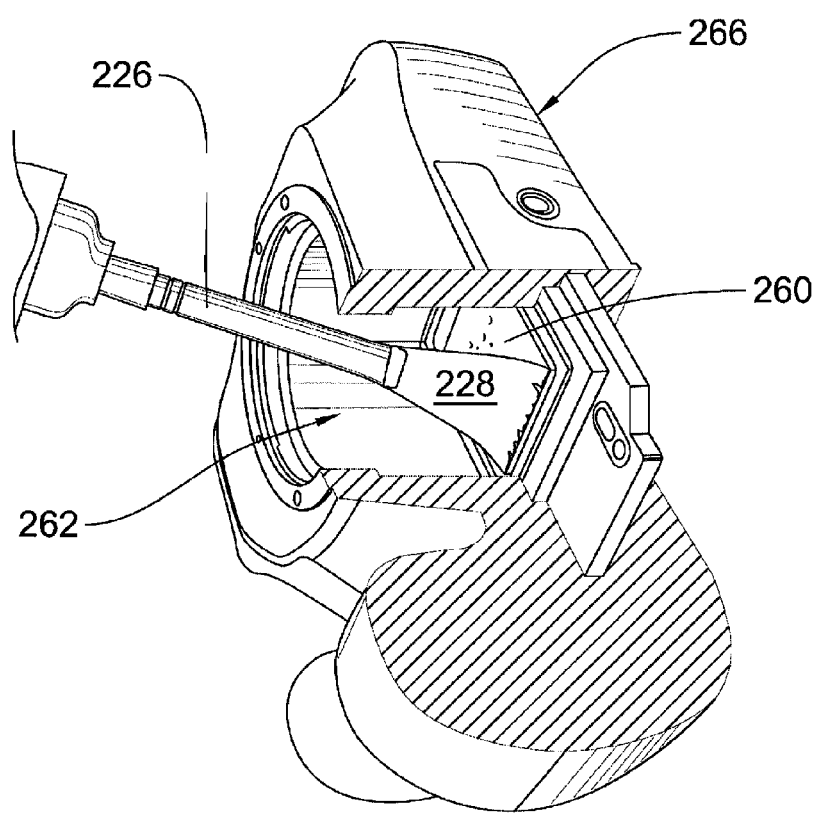
FIG. 11 is a perspective view of a portion of a digital camera in partially cut-away view, suggesting how the dusting tool of the present invention can be used to clean in a non-scrubbing fashion the exposed surface of the flat sensor lens on the floor of the camera sensor chamber.
Figure 14:
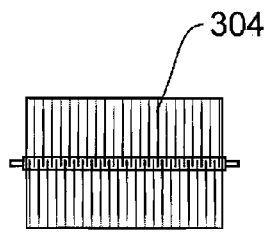
FIGS. 13 to 17 show a prior art roller-type dusting tool, with FIGS. 13-15 being views from a perspective similar to FIGS. 6 to 8 respectively, but showing only part of the handle, and with FIGS. 16 and 17 being views from a perspective similar to FIGS. 11 and 12 respectively, wherein there is suggested that the prior art dusting tool cannot reach the peripheral edge portion of the sensor lens exposed surface.
Figure 13:
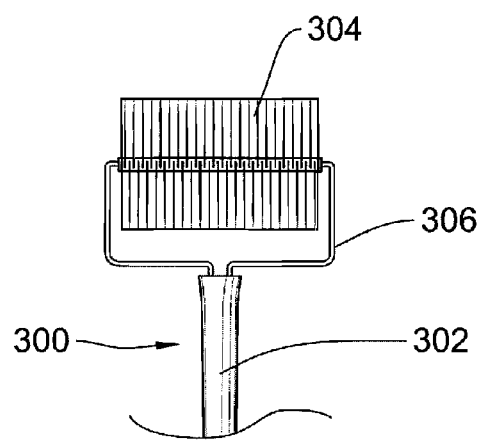
Figure 15:
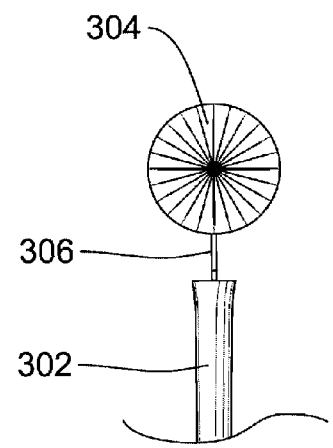
Figure 17:
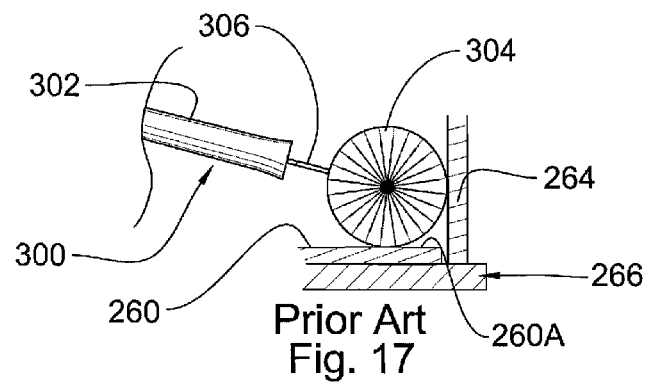
Figure 16:
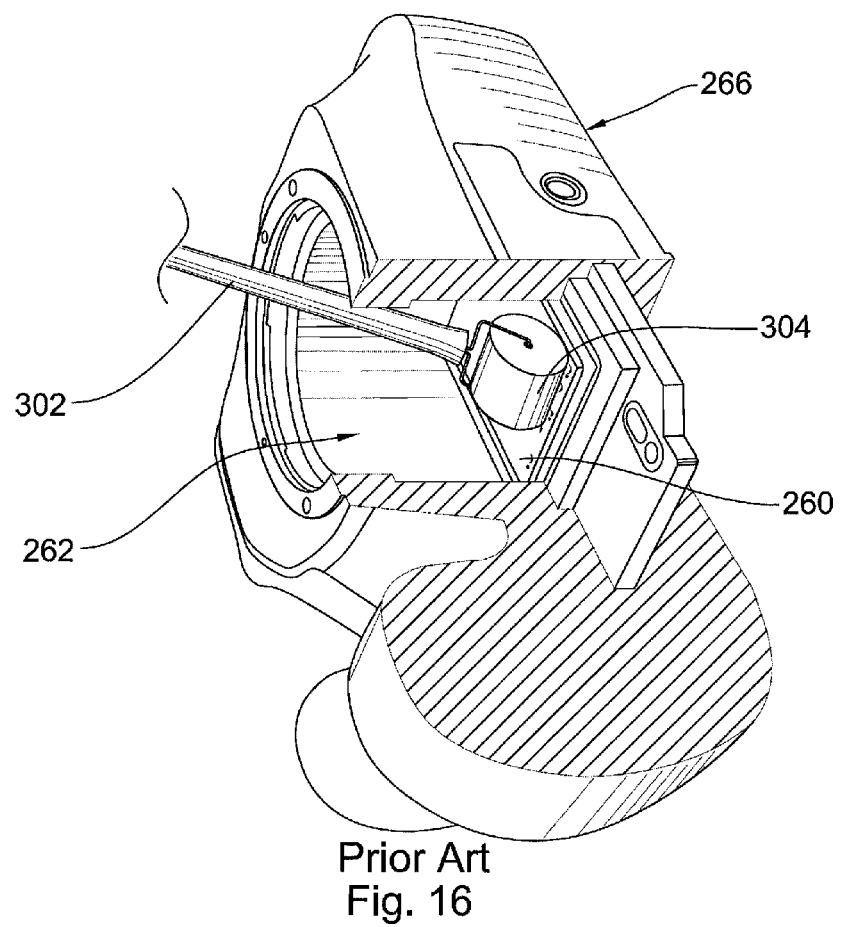

Preferably, and as best illustrated in FIGS. 8, 11 and 12, the leading edge tip portion 228A of the tuft of bristles will be tapered, to provide precision in the sensor lens surface to be cleaned while facilitating avoidance of accidental contaminating bristles engagement with the side walls 264 of the sensor chamber 262 of the digital camera 266.

FIGS. 13 to 17 show a prior art scrubbing channel 300, having a handle 302, a cylindroid roller 304 and a bracket 306 rotatably interconnecting handle 302 and roller 304. During cleaning operations, roller 304 rotates under power from a spin-inducing electric motor. It is clearly shown in FIG. 17 that as roller 304 moves toward but short of the peripheral edge of sensor lens 260, roller 304 comes to undesirably abut against the side wall 264 of the camera lens recessed chamber 262 preventing a peripheral edge portion 260A of the sensor remains uncleaned.

Clearly, such a prior art scrubbing tool 300 would be inefficient and in fact inoperative in removing dust particles from exposed surface 260 of the digital camera lens sensor at the bottom flooring 266 of this sensor chamber 262. Indeed, since some dust particles will always remain at peripheral edge 260A because of the incomplete cleaning operation of scrubbing tool 300, any motion of the digital camera will inevitably bring about migration of these remaining dust particles towards more central parts of this recessed sensor lens 260 that where previously cleaned, thus rendering useless the previous cleaning in the first place.

It is further noted that although the present cleaning tool has been described as a cleaning tool for digital camera sensors, the present cleaning tool could be used for cleaning other delicate surfaces, such as optics, i.e. the various glass elements of a camera lens, the mirror of a SLR camera, negative film, transparencies, electro-optical devices such as digital imaging devices, etc.

I claim:

1. A method of use of a dusting tool for cleaning an exposed surface of a camera sensor lens in a recessed digital camera sensor chamber while avoiding contaminating contact with side walls of a camera sensor chamber, the method comprising the following steps:

a) providing a non-scrubbing duster member defining an elongated shank having opposing first and second ends, a tuft of bristles having an electrostatic charge built up therein and a first connector means directly coupling the tuft of bristles to the first end; a handle; and second connector means directly coupling the handle to the second end, with each of the bristles defining a corresponding leading edge tip opposite the shank;
b) engaging the duster member inside the camera sensor chamber;
c) operatively engaging the leading edge tips of the bristles onto the exposed surface of the camera sensor lens;
d) manually sweeping the leading edge tips of the bristles over the exposed surface of the camera sensor lens including a peripheral edge portion thereof, and excluding contaminating contact with the side walls of the camera sensor chamber, while the duster member remains motionless relative to the handle.

2. A method of use of a dusting tool as in claim 1,
wherein in step (a), the electrostatic charge build-up is imparted to the bristles by applying a chemical to the bristles.

3. A method of use of a dusting tool as in claim 1,
wherein in step (a), the electrostatic charge build-up is imparted to the bristles by applying an ionization treatment to the bristles.

4. A method of use of a dusting tool as in claim 1,
further comprising the steps of:
e) providing a selectively activated duster actuator fixedly mounted to the handle and rotatably mounted to the shank;

g) depleting the electrostatic charge of the bristles following the sweeping of the leading edge tips of the bristles;
h) bringing the duster tool to an inoperative sensor lens cleaning condition and away from the camera sensor chamber; and
i) powering the actuator wherein the shank is power rotated and the bristles are brought to fan out radially under centrifugal forces leading to recharging of the electrostatic charge of the bristles while concurrently removing dust collected by the bristles during the manual sweeping step.

5. A method of use as in claim 1,
wherein in step (c), the operative engagement of the leading edge tips of the bristles includes the step of non-contacting sweeping action over the exposed surface of camera sensor lens in closely spaced fashion relative thereto.

6. A method of use as in claim 1,
wherein in step (c), the operative engagement of the leading edge tips of the bristles includes the step of direct contacting sweeping action against the exposed surface of camera sensor lens.

* * * * *